UNITED STATES PATENT OFFICE.

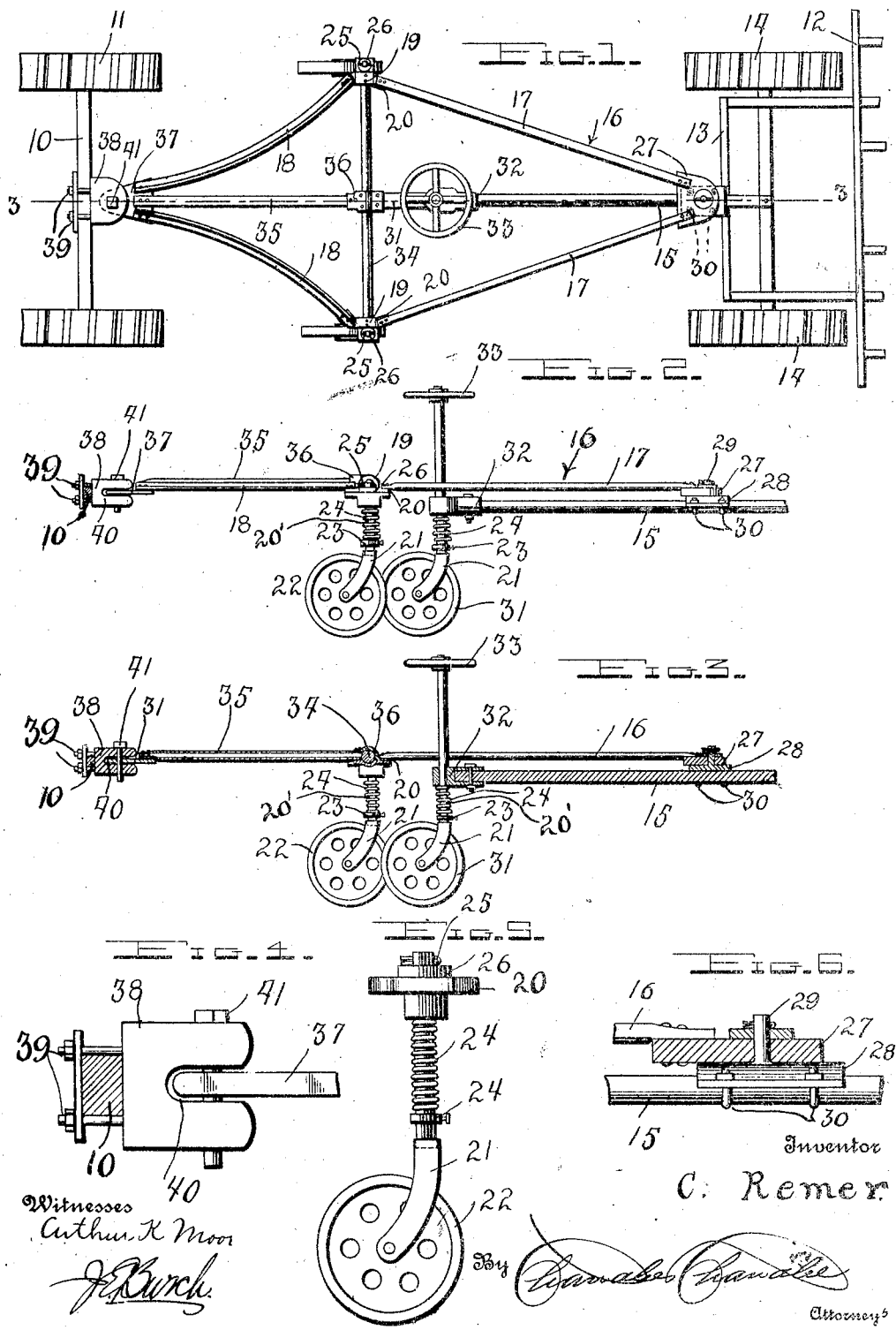

CHARLES REMER, OF MILES CITY, MONTANA.

HEADER-PUSH.

1,095,027.    Specification of Letters Patent.    Patented Apr. 28, 1914.

Application filed January 9, 1913. Serial No. 741,053.

*To all whom it may concern:*

Be it known that I, CHARLES REMER, a citizen of the United States, residing at Miles City, in the county of Custer, State of Montana, have invented certain new and useful Improvements in Header-Pushes; and I do hereby declare the following to be a full, clear, and exact description of the invention, such as will enable others skilled in the art to which it appertains to make and use the same.

This invention relates to an improved device for coupling a traction engine to a header or similar farm implement for the purpose of pushing the same in front of the traction engine and will be termed a header push.

The object of the invention is to provide an improved device of the above character which is coupled to the header pole and to the front axle of a traction engine and which includes a wheeled frame resiliently supported to absorb shocks incident to the travel of the header or engine over uneven ground surfaces, while means are also provided for guiding the header while in operation.

Another object of the invention is to provide a coupling which is pivotally connected to the traction engine and header respectively, the connection with the header being adjustable on the header pole, thereby giving the operator the desired leverage for guiding the header and maintaining control thereof while in operation.

With the above and other objects in view, the invention resides more particularly in the peculiar combinations and arrangements of parts as will be partly illustrated as a preferred embodiment in the accompanying drawings and described in the specification, although the invention is protected for all desirable changes and uses within the scope of the invention as claimed.

Figure 1 is a top plan view of the improved header push or coupling device in applied position. Fig. 2 is a side elevation of the device with the axle of the traction engine in section and the wheels omitted and simply showing the pole of the header. Fig. 3 is a central longitudinal sectional view on the line 3—3 of Fig. 1. Fig. 4 is an enlarged detail view of the end of the device attached to the axle of the traction engine. Fig. 5 is a similar view to illustrate the resilient mounting of the frame upon one of the caster wheels. Fig. 6 is a detail view partly in section of the end of the device attached to the draft pole of the header.

In illustrating the preferred embodiment of the invention, there is shown the front axle 10 of a traction engine of any preferred construction, the said axle having traction wheels 11 journaled on its ends and usually provided for guiding the engine. There is also illustrated in general outline a header mechanism 12 having the usual draft frame 13 at its rear portion, including the transporting wheel 14 and the draft pole 15.

It is the aim of this invention to provide an improved coupling for the above mentioned vehicles or machines to facilitate the pushing or advancement of the header by the traction engine through the medium of the ordinary draft pole, thus doing away with draft animals without changing the structure of the header materially. For this purpose there is provided a substantially diamond shaped or other supporting frame 16 which includes a pair of forwardly converging side bars 17 and a pair of rearwardly converging and inwardly curved or arcuate side bars 18. The frame work constituted by such parts is made of hollow pipe, tubing or other material.

The co-incident ends of the respective bars 17 and 18 are connected to bearing members 19 through the medium of plate extensions 20 carried by said bearing members and projecting forwardly and rearwardly thereof at a slight inward angle. The bearing members 19 are each provided with a vertically extending rectangular aperture receiving for vertical movement therethrough, the standard portions 20′ of wheeled frames situated at the extreme sides of the frame work. These standards are of similar cross section as the apertures of the bearings and are formed with forked members 21 having supporting or caster wheels 22 journaled therein, while collars 23 are adjustably mounted, one on each standard for engagement with a coiled spring 24 at its lower end.

The coiled springs 24 are engaged on the standards below the bearing members and are thus brought to bear or tend to exert downward pressure on the collars 23 whereby the frame work is supported on the springs and is capable of resilient vertical movement to absorb shocks incident to the travel over uneven ground surfaces. Keys, or cotter-pins 25 are engaged through the upper ends of the standards above washers 26 also mounted on the standard, thus serving to prevent displacement of the frame on the standards. The forked portions of the caster frames are swiveled to the lower ends of the standards to permit them to turn with the wheels and such forked portions are also curved rearwardly to decrease the liability of breakage.

In order to couple the device to the header pole, the forward extremities of the bars 17 or forward side portions of the frame work are connected to a bearing plate or circle hitch 27, such plate being vertically apertured as shown. The header or draft pole has mounted thereon a casting 28 which is provided with or formed with an integral upwardly extending pivot pin 29 engaging through the aperture of the plate 27 to pivotally connect the frame to the pole. This casting is clamped to the pole for longitudinal adjustment preferably by means of a pair of U bolts or clamps 30 whereby the length of the pole projecting rearwardly of such plate may be varied to increase or decrease the leverage in guiding the header from the free extremity of the draft pole. For this latter purpose, a caster wheel 31 is mounted at the rear end of the pole being connected thereto by its frame portion 32, but in this instance the fork and standard are rigid, whereby the caster wheel may be turned in the desired direction through the instrumentality of a hand operated guide wheel 33 which is secured to the standard against rotation. The other parts of this caster frame are the same as described in connection with side portions of the frame or frame work 16 and it will be obvious that turning of the caster wheel 31 in either direction will direct or guide the header in the opposite direction.

The frame 16 is intermediately provided with a cross brace 34 which extends between the bearings 19 to which it is connected and a longitudinal brace 35 at its forward end is connected to the cross brace 34, as by means of a T-joint 36. The rear ends of the bars 18 and the rear end of the brace 35 are connected to a substantially triangular casting 37 which is in turn pivoted to a coupling block 38 bolted or clamped to the front axle 10 of the traction engine, as shown at 39. For this purpose the forward end of the block 38 is bifurcated as shown at 40 to receive the tapered end of the casting or plate 37 and a coupling pin 41 is engaged through the bifurcations and an aperture in the casting and is capable of removal for uncoupling the machines.

From Fig. 1 of the drawings it will be observed that the line of draft between the traction engine and the header is located on a line co-incident with or connecting the pivots of the frame with the engine and header, while the caster wheels at the sides of the frame travel in line with the wheels 11 and 14. By this means, the frame turns substantially the same degree and in angular relation with regard to the header and engine or motive power and the tongue may be shifted on its pivot by turning the caster wheel 31 in either direction. When this is done the tongue will move in an arc concentric to the pin 29 as a pivot and between the side portions 17 of the frame, so as to guide the header in a direction opposite to the direction in which the tongue or pole swings, while at the same time positive control of the header is obtained.

What is claimed:

1. The combination with a header having a draft pole; of a tractor, and a wheeled frame connected to the tractor and pivoted to the draft pole.

2. The combination with the draft pole of a vehicle; of means at the forward end of the draft pole for guiding the same, and a coupling connected to the draft pole to the rear of the guide means and including a frame having spaced members adapted to embrace the guide means and permit movement of the same independent of the frame, means for pivotally connecting said frame to the pole, and means carried by said frame and adapted for connection to a tractor.

3. The combination with a header having a draft pole rigid therewith and motive power means for advancing the header; of a wheeled frame connected to the motive power means and pivoted to the draft pole, said frame tapering toward its forward and rear ends.

4. The combination with a header having a draft pole rigid therewith and motive power means for advancing the header; of a wheeled frame connected to the motive power means and pivoted to the draft pole, said pole frame being adapted for angular movement one with respect to the other and means carried by the pole for guiding it toward either side of the frame.

5. A header push embodying a frame having side bars, caster wheels at the sides of said frame, spring means supporting the frame over the wheels and coupling means at either end of the frame.

6. A header push embodying a frame having side bars, caster wheels at the sides of said frame, spring means supporting the frame over the wheels, braces for the frame, a coupling plate at one end of the frame, a casting removably pivoted thereto and adapted to be clamped to a traction engine and a casting adapted for slidable engagement with a draft tongue and pivotal attachment with the other end of the frame.

In testimony whereof, I affix my signature, in the presence of two witnesses.

CHARLES REMER.

Witnesses:
 FRED W. LUCK,
 HARRISON JENNINGS.